United States Patent Office 2,839,522
Patented June 17, 1958

2,839,522

MONOAZO DYESTUFFS OF THE PYRAZOLONE SERIES AND THEIR CHROMIUM COMPLEX COMPOUNDS

Piero Maderni, Binningen, near Basel, and Otto Senn, Arlesheim, near Basel, Switzerland, assignors to Sandoz A. G., Basel, Switzerland, a Swiss firm No Drawing. Application November 29, 1956
Serial No. 624,987

6 Claims. (Cl. 260—147)

The present invention relates to new valuable monoazo dyestuffs of the pyrazolone series and their chromium complex compounds which, in the metal-free state, correspond to the formula

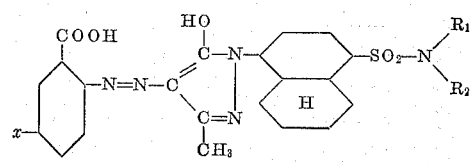

wherein $x$ represents a hydrogen atom or a sulfonic acid amide, a sulfonic acid lower alkylamide, a sulfonic acid lower dialkylamide, a sulfonic acid lower hydroxyalkylamide, a sulfonic acid lower alkoxyalkylamide, a sulfonic acid morpholide, a sulfonic acid cyclohexylamide, a sulfonic acid benzylamide or a sulfonic acid arylamide group of the benzene or naphthalene series which is free from carboxylic and sulfonic acid groups, $R_1$ represents a hydrogen atom or a lower alkyl group, and $R_2$ represents a hydrogen atom or a lower alkyl, lower hydroxyalkyl, lower alkoxyalkyl or mononuclear aryl group, or together with $R_1$ and N a morpholyl radical.

These monoazo dyestuffs of the pyrazolone series are obtained when 1 mol of the diazo compound from a 2-aminobenzene-1-carboxylic acid corresponding to the general formula

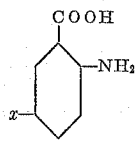

wherein $x$ has the aforesaid significances, is coupled with 1 mol of the amide of 1-(5',6',7',8'-tetrahydro-1')-naphthyl-3-methyl-5-pyrazolone-4'-sulfonic acid which if desired can be substituted on the nitrogen atom by lower alkyl, lower hydroxyalkyl, lower alkoxyalkyl, morpholyl or aryl of the benzene series free from sulfonic acid and carboxylic acid groups; the said 1-(5',6',7',8'-tetrahydro-1')-naphthyl - 3 - methyl - 5 - pyrazolone - 4' - sulfonic acid amides can for example be prepared in the usual manner from the sulfonic acid obtained by dry heating the acid sulfate of the 1-amino-5,6,7,8-tetrahydronaphthalene. The monoazo dyestuffs thus obtained are treated with a chromium-yielding substance on the fiber or in substance.

The coupling of the above defined diazotized 2-aminobenzene-1-carboxylic acids with the pyrazolone sulfonic acid-amides or their above defined derivatives takes place advantageously in an alkaline medium. The dyestuffs formed are filtered off and dried. They dissolve in water with a yellow color and dye wool according to the single bath chroming process or by the after-chroming process in yellow shades of excellent fastness to light and to milling and to carbonizing.

Conversion into the chromium containing azo dyestuffs is carried out with salts of chromium as e. g. chromium fluoride, chromium sulfate, chromium formate, chromium acetate, and potassium chromium sulfate, in aqueous suspension or solution or in an organic medium as for example in a polyglycol or in formamide, or in concentrated aqueous solutions of an alkali metal salt of a lower molecular aliphatic monocarboxylic acid. Chromates as e. g. sodium or potassium chromates or bichromate, are also suitable for metallizing which in this case advantageously takes place in a caustic alkali medium, if desired in the presence of a reducing agent. Metallizing in substance furnishes chromium complex compounds which contain less than 2 atoms of chromium and advantageously about 1 atom of chromium to 2 mols of monoazo dyestuff.

The chromium-containing azo dyestuffs are advantageously separated out from the aqueous medium by the addition of salt, and where appropriate this is done after pouring the organic metallizing solution into water. They are dark yellow powders which dissolve in water with a yellow color and dye wool, silk, leather, and artificial nitrogen-containing fibers as e. g. synthetic polyamide fibers, in yellow shades which are fast to light, washing and milling. The metal complex compounds, thanks to their good solubility in organic solvents, are eminently suitable for dyeing spinning solutions and artificial materials and for the coloring of lacquers.

The following examples illustrate the invention without limiting it. The parts therein denotes parts by weight, percentages denote percentages by weight and the temperatures are given in degrees centigrade.

EXAMPLE 1

A cold diazo solution (volume about 250 cc.) obtained from 13.7 parts of 2-aminobenzene-1-carboxylic acid is added with stirring to a cold solution of 30.7 parts of 1-(5',6',7',8' - tetrahydro - 1') - naphthyl - 3 - methyl - 5-pyrazolone-4'-sulfonic acid-amide in 400 parts of water and 40 parts of 30% sodium hydroxide solution. After the coupling is finished, the monoazo dyestuff which corresponds to the formula

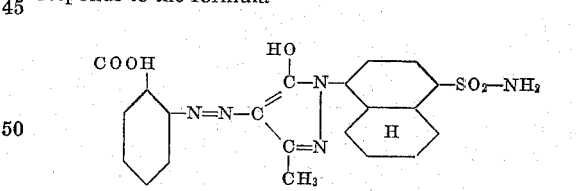

is precipitated out by the addition of sodium bicarbonate, filtered off and dried in a vacuum at 85°. A yellow powder is obtained which dissolves in water, dilute sodium hydroxide solution, or concentrated sulfuric acid with a yellow color and dyes wool and synthetic polyamide fibers by the single bath chroming process or the after-chroming process in yellow shades of outstanding fastness to light and milling.

EXAMPLE 2

6.8 parts of the dyestuff obtained according to Example 1 are converted into the chromium complex compound by heating in 40 parts of ethylpolyglycol for 2½ hours at 95–105° with 2 parts of chromium formate. Thereupon the solution is poured into 100 parts of 5% sodium chloride solution. The precipitated chromium complex compound is filtered off and suspended in about 100 parts of water at 70°. The suspension is brought to a pH value of 9 by the addition of sodium hydroxide;

the chromium containing dyestuff which corresponds to the formula

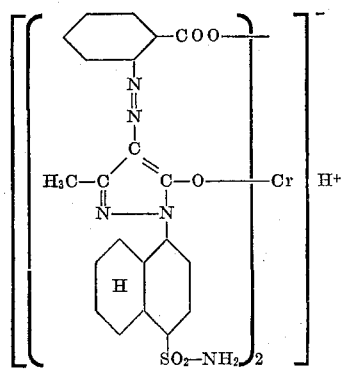

is filtered off and dried at 80°. A yellow-brown powder is obtained which dissolves in dilute sodium hydroxide solution and in concentrated sulfuric acid with a yellow color and dyes wool, silk, and synthetic polyamide fibers in greenish-yellow shades fast to light, washing and milling.

EXAMPLE 3

By working according to the data of Example 1, and replacing the coupling component used therein by 32.1 parts of 1-(5',6',7',8'-tetrahydro-1')-naphthyl-3-methyl-5-pyrazolone-4'-sulfonic acid-methylamide (as in the introduction) a yellow monoazo dyestuff which corresponds to the formula

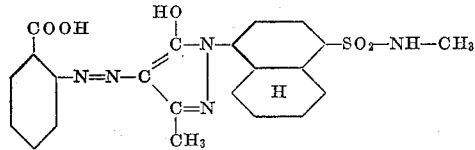

is obtained. The chromium complex compound of this monoazo dyestuff corresponding to the formula

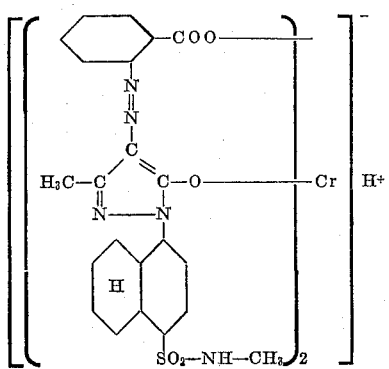

is prepared according to the data of Example 2 and has similar properties to those described in that example.

The following tables show further examples. In these the column A denotes the aminobenzene carboxylic acid used for preparing the diazo solution, and column B denotes the amide residue of the 1-(5',6',7',8'-tetrahydro-1')-naphthyl-3-methyl-5-pyrazolone-4'-sulfonic acid used as coupling component as previously defined. Column C denotes the use to which the dyestff is put.

All of these dyestuffs dye in yellow shades. Several of the complex compounds of the dyestuffs shown in these tables, as also that of Example 2, are suitable on account of their solubility in acetone for the dyeing of dissolved substances to be used for spinning as for example acetate.

Table

| Ex-No. | (A) | (B) | (C) |
|---|---|---|---|
| 4 | 2-aminobenzene-1-carboxylic acid. | Dimethylamide | Dyestuff for chroming. Chromium complex for dyeing wool, nylon and spinning solutions. |
| 5 | ...do... | Ethylamide | Dyestuff for chroming. |
| 6 | ...do... | 3-methoxy-propylamide. | Dyestuff for chroming. Chromium complex for wool or nylon. |
| 7 | ...do... | Isopropylamide | Dyestuff for chroming. |
| 8 | ...do... | 2-hydroxyethyl-amide. | Duestuff for chroming. Chromium complex for wool or nylon. |
| 9 | ...do... | Phenylamide | Dyestuff for chroming. |
| 10 | ...do... | Morpholide | Dyestuff for chroming. Chromium complex for wool, nylon and spinning solutions. |
| 11 | 2-amino-1-carboxy-benzene-5-sulfonic acid-amide. | 3-methoxypropylamide. | Dyestuff for chroming. Chromium complex for wool and nylon. |
| 12 | 2-amino-1-carboxy-benzene-5-sulfonic acid-methylamide | Amide | Do. |
| 13 | ...do... | 3-methoxypropylamide. | Do. |
| 14 | ...do... | 2-hydroxy-ethyl-amide. | Do. |
| 15 | 2-amino-1-carboxy-benzene-5-sulfonic acid-phenylamide. | Amide | Dyestuff for chroming. Chromium complex for wool, nylon, and spinning solutions. |
| 16 | ...do... | Ethylamide | Dyestuff for chroming. Chromium complex for spinning solutions. |
| 17 | ...do... | Isopropylamide | Do. |
| 18 | ...do... | 3-methoxypropylamide. | Do. |
| 19 | ...do... | 2-hydroxy-ethyl-amide. | Dyestuff for chroming. Chromium complex for wool, nylon and spinning solutions. |
| 20 | 2-amino-1 carboxy-benzene-5-sulfonic acid-dimethylamide. | Amide | Dyestuff for chroming. |
| 21 | 2-amino-1-carboxy-benzene-5-sulfonic acid-(3'-methoxy)-propylamide. | ...do... | Do. |
| 22 | 2-amino-1-carboxy-benzene-5-sulfonic acid-(2'-hydroxy)-propylamide. | ...do... | Dyestuff for chroming. Chromium complex for wool and nylon. |
| 23 | ...do... | Phenylamide | Dyestuff for chroming. |
| 24 | 2-amino-1-carboxy-benzene-5-sulfonic acid-cyclohexyl-amide. | Amide | Do. |
| 25 | 2-amino-1-carboxy-benzene-5-sulfonic acid-benzylamide. | ...do... | Do. |
| 26 | 2-amino-1-carboxy-benzene-5-sulfonic acid-naphthyl-(1')-amide. | ...do... | Do. |
| 27 | 2-amino-1-carboxy-benzene-5-sulfonic acid-[5', 6', 7', 8'-tetrahydronaphthyl-(1')]-amide. | ...do... | Do. |
| 28 | 2-amino-1-carboxy-benzene-5-sulfonic acid-morpholide. | ...do... | Dyestuff for chroming. Chromium complex for wool and nylon. |
| 29 | 2-amino-1-carboxy-benzene-5-sulfonic acid-(4'-methyl)-phenylamide. | ...do... | Dyestuff for chroming. Chromium complex for wool, nylon and spinning solutions. |

EXAMPLE 30

A dyebath is prepared from 4000 parts of water, 1 part of the chromable dyestuff obtained according to Example 1, 1 part of potassium chromate, 7 parts of ammonium sulfate and 10 parts of Glauber salt. 100 parts of wool are entered therein at 40°. The bath is heated to boiling within 30 minutes and maintained boiling for 90 minutes. The dyed wool is thereupon removed from the bath, rinsed with water and finally dried.

EXAMPLE 31

100 parts of wool are entered at 40° into a dyebath consisting of 1 part of the chromium-containing azo dyestuff obtained according to Example 2, 4000 parts of water, and 5 parts of ammonium sulfate. The bath is heated to boiling within 30 minutes and maintained boiling for 60 minutes. After cooling for a short while, the dyed wool is removed from the bath, rinsed with water and dried.

Synthetic polyamide fibers are dyed in the same manner as wool but silk at a slightly lower temperature, e. g. 95°.

The formulae of representative dyestuffs of the foregoing examples are as follows:

EXAMPLE 6

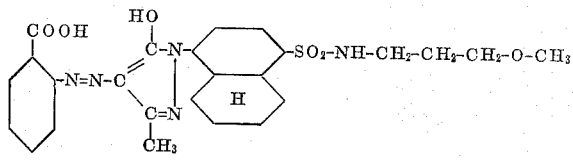

and

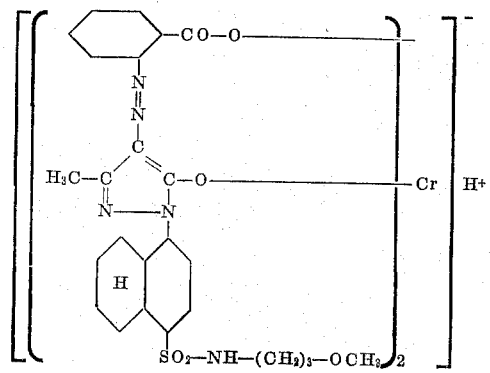

EXAMPLE 7

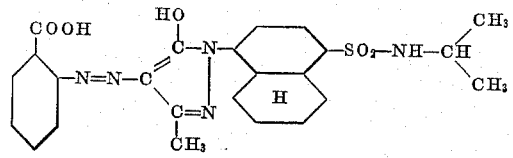

Having thus disclosed the invention, what is claimed is:

1. A member selected from the group consisting of a monoazo dyestuff of the pyrazolone series which corresponds to the formula

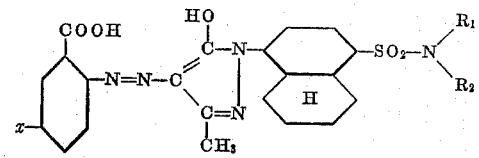

wherein $x$ represents a member selected from the group consisting of a hydrogen atom, a sulfonic acid amide group, a sulfonic acid lower alkylamide group, a sulfonic acid lower dialkylamide group, a sulfonic acid lower hydroxyalkylamide group, a sulfonic acid lower alkoxyalkylamide group, a sulfonic acid morpholide group, a sulfonic acid cyclohexylamide group, a sulfonic acid benzlyamide group, a sulfonic acid arylamide group of the benzene series free from carboxylic acid and sulfonic acid groups and a sulfonic acid arylamide group of the naphthalene series free from carboxylic acid and sulfonic acid groups, $R_1$ represents a member selected from the group consisting of a hydrogen atom and a lower alkyl group, and $R_2$ represents a member selected from the group consisting of a hydrogen atom, a lower alkyl radical, a lower hydroxyalkyl radical, a lower alkoxyalkyl radical, an aryl radical of the benzene series and, together with $R_1$ and —N< a morpholyl radical, and the chromium complex compound thereof.

2. The monoazo dyestuff which corresponds to the formula

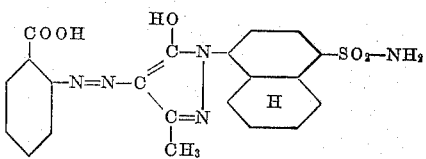

3. The chromium complex dyestuff which corresponds to the formula

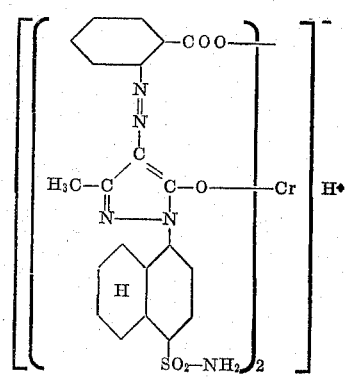

4. The monoazo dyestuff which corresponds to the formula

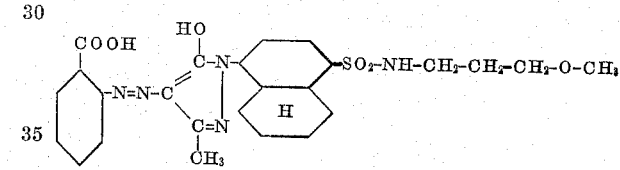

5. The chromium complex dyestuff which corresponds to the formula

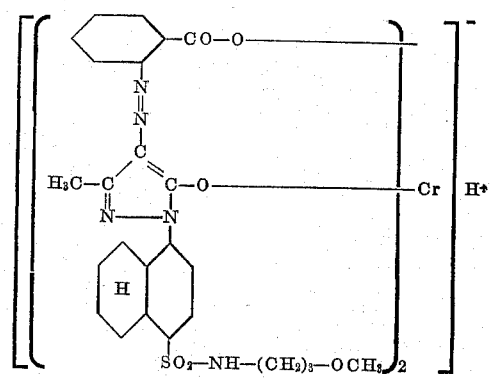

6. The monoazo dyestuff which corresponds to the formula

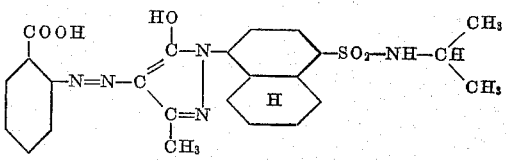

References Cited in the file of this patent

UNITED STATES PATENTS

| | | |
|---|---|---|
| 2,518,078 | Schmid et al. | Aug. 8, 1950 |
| 2,606,185 | Widmer et al. | Aug. 5, 1952 |
| 2,673,201 | Zickendraht et al. | Mar. 23, 1954 |